United States Patent
Rong et al.

(10) Patent No.: US 9,658,396 B2
(45) Date of Patent: May 23, 2017

(54) VERTICAL OPTICAL COUPLER FOR PLANAR PHOTONIC CIRCUITS

(75) Inventors: Haisheng Rong, Pleasanton, CA (US); Ofir Gan, Oiryat-Gat (IL); Pradeep Srinivasan, Fremont, CA (US); Assia Barkai, Jeruslaem (IL); I-Wei Andy Hsieh, Bethesda, MA (US); Mahesh Krishnamurthi, San Jose, CA (US); Yun-Chung Neil Na, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/581,858

(22) PCT Filed: Sep. 29, 2011

(86) PCT No.: PCT/US2011/053992
§ 371 (c)(1),
(2), (4) Date: Aug. 30, 2012

(87) PCT Pub. No.: WO2013/048411
PCT Pub. Date: Apr. 4, 2013

(65) Prior Publication Data
US 2014/0205234 A1 Jul. 24, 2014

(51) Int. Cl.
*G02B 6/12* (2006.01)
*G02B 6/122* (2006.01)
(Continued)

(52) U.S. Cl.
CPC ........... *G02B 6/1225* (2013.01); *G02B 1/045* (2013.01); *G02B 6/1223* (2013.01); *G02B 6/14* (2013.01); *G02B 6/262* (2013.01); *G02B 6/4201* (2013.01)

(58) Field of Classification Search
CPC .................. G02B 6/327; G02B 6/1223
(Continued)

(56) References Cited

U.S. PATENT DOCUMENTS 5,142,596 A * 8/1992 Mizuuchi ............ G02B 6/1228
359/326
5,391,869 A 2/1995 Ade et al.
(Continued)

FOREIGN PATENT DOCUMENTS

JP 08288542 11/1996
JP 08288543 11/1996
(Continued)

OTHER PUBLICATIONS

Notification Concerning Transmittal of International Preliminary Report on Patentability issued for PCT Patent Application No. PCT/US2011/053992, mailed Apr. 10, 2014, 7 pages.
(Continued)

Primary Examiner — Charlie Y Peng
(74) Attorney, Agent, or Firm — Blakely, Sokoloff, Taylor & Zafman LLP

(57) ABSTRACT

Described herein are an apparatus, system, and method for providing a vertical optical coupler (VOC) for planar photonics circuits such as photonics circuits fabricated on silicon-on-insulator (SOI) wafers. In one embodiment, the VOC comprises a waveguide made from a material having refractive index in a range of 1.45 to 3.45, the waveguide comprising: a first end configured to reflect light nearly vertical by total internal reflection between the waveguide and another medium, a second end to receive the light for reflection, and a third end to output the reflected light. The VOC couples with a Si waveguide having a first region including: a first end to receive light; and an inverted tapered end in the direction of light propagation to output the
(Continued)

received light, wherein the inverted tapered end of the Si waveguide is positioned inside the waveguide.

17 Claims, 10 Drawing Sheets

(51) Int. Cl.
  *G02B 6/42* (2006.01)
  *G02B 1/04* (2006.01)
  *G02B 6/14* (2006.01)
  *G02B 6/26* (2006.01)

(58) Field of Classification Search
  USPC .......................................................... 385/28
  See application file for complete search history.

(56) References Cited

U.S. PATENT DOCUMENTS

| | | | |
|---|---|---|---|
| 6,108,478 A * | 8/2000 | Harpin | G02B 6/1228 385/129 |
| 6,396,984 B1 * | 5/2002 | Cho | G02B 6/1228 385/28 |
| 6,898,336 B2 | 5/2005 | Rong | |
| 6,989,284 B2 * | 1/2006 | Salib | G02B 6/1228 438/31 |
| 7,256,929 B1 | 8/2007 | Rong et al. | |
| 7,266,258 B2 | 9/2007 | Liu et al. | |
| 7,388,894 B2 | 6/2008 | O'Daniel et al. | |
| 7,421,200 B2 | 9/2008 | Liu et al. | |
| 7,489,439 B2 | 2/2009 | Kuo et al. | |
| 7,643,710 B1 | 1/2010 | Liu | |
| 7,760,422 B2 | 7/2010 | Kuo et al. | |
| 7,840,098 B2 | 11/2010 | Rong | |
| 8,249,404 B2 | 8/2012 | Fujii et al. | |
| 8,435,809 B2 | 5/2013 | Heck et al. | |
| 8,437,585 B2 | 5/2013 | Na | |
| 8,450,186 B2 | 5/2013 | Rong et al. | |
| 8,461,624 B2 | 6/2013 | Na et al. | |
| 8,488,923 B2 | 7/2013 | Na et al. | |
| 8,588,570 B2 | 11/2013 | Rong et al. | |
| 8,625,937 B2 | 1/2014 | Yin et al. | |
| 8,625,942 B2 | 1/2014 | Na et al. | |
| 9,002,163 B2 * | 4/2015 | Fang | G02B 6/1228 385/129 |
| 2006/0072875 A1 * | 4/2006 | Bhagavatula et al. | 385/30 |
| 2008/0240651 A1 | 10/2008 | Rong et al. | |
| 2010/0074579 A1 | 3/2010 | Fujii et al. | |
| 2010/0135619 A1 * | 6/2010 | Choi et al. | 385/88 |
| 2010/0265504 A1 | 10/2010 | Kopp et al. | |
| 2011/0116741 A1 * | 5/2011 | Cevini et al. | 385/28 |
| 2011/0156183 A1 * | 6/2011 | Liu | 257/432 |
| 2012/0155820 A1 | 6/2012 | Heck et al. | |
| 2012/0250157 A1 | 10/2012 | Na et al. | |
| 2014/0231946 A1 | 8/2014 | Kang et al. | |

FOREIGN PATENT DOCUMENTS

| | | |
|---|---|---|
| JP | 2003344690 A | 12/2003 |
| JP | 2004061992 | 2/2004 |
| JP | 3941589 | 4/2007 |
| TW | I28067 B | 5/2007 |
| TW | 201126217 A | 8/2011 |

OTHER PUBLICATIONS

International Search Report & Written Opinion mailed Feb. 29, 2012 for International Patent Application No. PCT/US2011/053992.
Almeida, Vilson R., et al. "Nano-taper for Compact Mode Conversion", Optic Letters, Optical Society of America, vol. 28, No. 15, pp. 1302-1304, Aug. 1, 2003.
McNab, Sharee J., et al. "Ultra-low loss photonic integrated circuit with membrane-type photonic crystal waveguides", Optic Express, vol. 11, pp. 2927-2939, 2003.
Taiwanese Office Action for Counterpart Taiwanese Patent Application No. 101130838 dated May 20, 2014, 16 pages including English Translation.
Taiwanese Office Action for Counterpart Taiwanese Patent Application No. 101130838 dated Oct. 21, 2014, 13 pages including English Translation.
Notice of Preliminary Rejection in counterpart Korean Patent Application No. 2014-7008189, mailed Jul. 9, 2015, 12 pages including English Translation.

* cited by examiner

US 9,658,396 B2

VERTICAL OPTICAL COUPLER FOR PLANAR PHOTONIC CIRCUITS

CLAIM OF PRIORITY

The present application is a US National Stage Application of, and claims priority to and incorporates by reference, the corresponding PCT Patent Application No. PCT/US2011/053992 filed Sep. 29, 2011, and entitled "Vertical Optical Coupler for Planar Photonic Circuits."

FIELD OF THE INVENTION

Embodiments of the invention relate generally to the field of photonics. More particularly, embodiments of the invention relate to an apparatus, system, and method for providing a vertical optical coupler for planar photonics circuits such as silicon photonics circuits fabricated on silicon-on-insulator (SOI) wafers.

BACKGROUND

In typical integrated planar photonics circuits, such as silicon-on-insulator (SOI) photonic systems, light is confined in a wafer (or chip) plane. In order to couple light in or out of the photonics circuits, the wafer is typically diced into chips and each chip facet is optically polished to allow efficient optical coupling. This optical coupling scheme is referred to as an edge coupling scheme. The input or output light beam in this coupling scheme is parallel to the surface and normal to the edge or facet of the chip.

However, the edge coupling scheme has several limitations. For example, the photonics circuits based on the edge coupling scheme can only be tested and packaged after the wafer is diced up into chips and individual chips are polished. This process for testing and packaging is costly, time consuming, and hardly scalable to high volume manufacturing.

Silicon (Si) photonics is one of the most popular and successful technology platforms based on planar photonics circuits for cost effective opto-electronics integration. Optical waveguide based photonics devices such as lasers, modulators, and detectors are fabricated on silicon-on-insulator (SOI) wafers.

Si waveguides are typically designed with submicron cross-sections, allowing dense integration of active and passive devices to achieve higher speed and lower driving power. Due to the high refractive index contrast between Si and air (or glass), the numerical aperture (NA) of light exiting the Si chip is much larger than the typical NA of optic fibers. As a result, optical mode converters (OMCs) are typically used to improve optical coupling between Si waveguides and optic fibers. Conventional OMC's are based on edge coupling schemes discussed above where light exits along the wafer surface.

One possible way of coupling light out of the wafer surface from a horizontally oriented optical waveguide in the wafer plane is connecting a grating coupler to the waveguide. However, a grating coupler has low efficiency, limited bandwidth (wavelength dependent coupling efficiency), and strong polarization dependence. Typically, light emits at an angle off the surface normal of the wafer, requiring, e.g., an angle-polished fiber to couple light in and/or out of the chip.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

SUMMARY

Figure 1A:
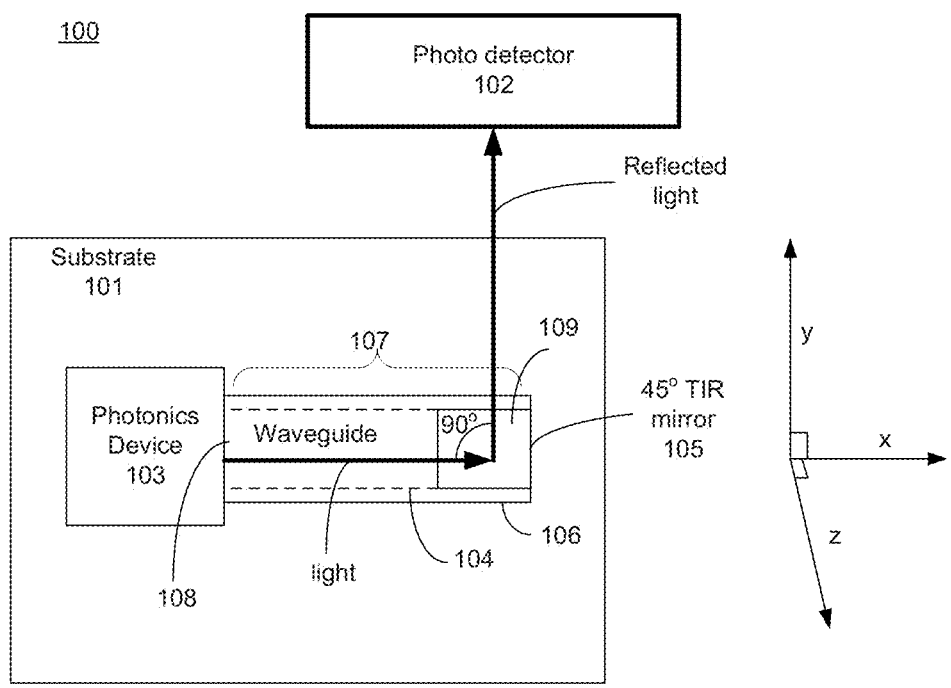
FIG. 1A is an optical system comprising a vertical optical coupler (VOC) and an optical mode converter (OMC) coupled to a photonics device, according to one embodiment of the invention.

Described herein embodiments of the invention that relate to an apparatus, system, and method for providing a vertical optical coupler for planar photonics circuits such as silicon photonics circuits fabricated on silicon-on-insulator (SOI) wafers. Described herein are embodiments for fabricating a vertical optical coupler based on total internal reflection, combined with an optical mode converter. In one embodiment, the vertical optical coupler is wavelength and polarization independent, and has surface normal coupling, enabling both wafer scale optical testing and low cost packaging.

In one embodiment, the vertical mode converter comprises: a waveguide made from a material having refractive index in a range of 1.45 to 3.45, the waveguide comprising: a first end configured to reflect light nearly vertical by total internal reflection between the waveguide and another medium, a second end to receive the light for reflection, and a third end to output the reflected light. The vertical mode converter couples with a silicon (Si) waveguide having a first region including: a first end to receive light; and an inverted tapered end in the direction of light propagation to output the received light, wherein the inverted tapered end of the Si waveguide is positioned inside the waveguide.

In one embodiment, the system comprises: a vertical mode converter comprising: a waveguide made from a material having refractive index in a range of 1.45 to 3.45, the waveguide comprising: a first end configured to reflect light nearly vertical by total internal reflection between the waveguide and another medium, a second end to receive the light for reflection, and a third end to output the reflected light; and a photonics device coupled to the optical mode converter and operable to modulate light before it is received by the optical mode converter.

In one embodiment, the method of forming the vertical mode converter comprises: forming an oxide layer on a wafer; performing oxide etch on the oxide layer to generate a nearly 45 degree linear profile in the oxide layer; and depositing a material on one side of the nearly 45 degree linear profile while oxide is on the other side of the nearly 45 degree linear profile, the material forming a waveguide and having a refractive index in a range of 1.45 to 3.45.

While the summary of the invention has been described in conjunction with specific embodiments thereof, many alternatives, modifications and variations of such embodiments will be apparent to those of ordinary skill in the art in light of the foregoing description. The embodiments of the invention are intended to embrace all such alternatives, modifications, and variations as to fall within the broad scope of the appended claims.

DETAILED DESCRIPTION

Embodiments of the invention relate to an apparatus, system, and method for providing a vertical optical coupler for planar photonics circuits such as silicon (Si) photonics circuits fabricated on silicon-on-insulator (SOI) wafers. The embodiments described herein are embodiments to provide vertical coupling between Si based waveguide and an optical device by means of an angled mirror in the Si based waveguide. In one embodiment, the angle of the angled mirror is greater than a critical angle so that the angled mirror emits light at a direction nearly normal to the wafer plane using total internal reflection (TIR), thus exhibiting a broadband response. Described herein are embodiments for fabricating a vertical optical coupler based on total internal reflection, combined with an optical mode converter. In one embodiment, the vertical optical coupler is wavelength and polarization independent, and has surface normal coupling, enabling both wafer scale optical testing and low cost packaging.

The term "critical angle" herein refers to an angle of incidence above which TIR occurs. The term "nearly" herein refers to within 20% of a target value (including being 100% of the target value). For example, nearly vertical means within 20% of perfect vertical emission—vertical relative to the surface of the Si wafer, and nearly 45 degree cut means a cut having an angle within 20% of a perfect 45 degree cut, etc.

In one embodiment, a device (also called the apparatus and/or Si photonic device) comprises a waveguide made from a material having refractive index in a range of 1.45 to 3.45. In one embodiment, the waveguide comprises: a first end configured to reflect light at nearly a right angle by TIR between the waveguide and another medium. In one embodiment, the waveguide comprises a second end to receive the light for reflection, and a third end to output the reflected light, wherein the first end has an angled cut with an angle greater than a critical angle so that the angled cut emits light at a direction which is nearly normal to the wafer plane using TIR, thus exhibiting a broadband response. The angled cut has an angle greater than the TIR angle. In one embodiment, the angle of the angled mirror is a nearly 45 degree angle, which is in the path of light propagation through the waveguide, wherein the nearly 45 degree angle to cause TIR between the waveguide and the other medium. In one embodiment, the polymeric material is one of: Si Nitride ($Si_3N_4$); Silicon OxyNitride (SiON); Polyimide; or SU8. "SU8" is an epoxy-based negative photo-resist. In one embodiment, the other medium is air.

In one embodiment, the device further comprises: a Si waveguide having a first region including: a first end to receive light; and an inverted tapered end in the direction of light propagation to output the received light, wherein the inverted tapered end of the Si waveguide is positioned inside the waveguide made from the polymeric material. In one embodiment, the device further comprises an anti-reflective coating (ARC) layer, abutting the third end of the waveguide made from the polymeric material, wherein the ARC layer is added to reduce internal reflection of the light being output from the third end.

Embodiments herein also describe a method for forming the above mentioned device. In one embodiment, the method comprises: forming an oxide layer on a wafer (e.g., a Si wafer); and performing oxide etch on the oxide layer to generate an angled cut in the oxide with a linear profile. In one embodiment, the angled cut has an angle greater than the TIR angle. In one embodiment, the angled cut is a nearly 45 degree linear profile cut in the oxide layer. In one embodiment, the method further comprises depositing a material on one side of the nearly 45 degree linear profile while oxide is on the other side of the nearly 45 degree linear profile, the material forming a waveguide and having a refractive index in a range of 1.45 to 3.45 m the waveguide made from polymeric material ($Si_3N_4$, Polyimide, or SU8). In one embodiment, the process of performing oxide etch on the oxide layer comprises: forming a photo-resist layer on the oxide layer; heating the photo-resist layer to generate a non-linear resist profile; and performing a multi-stage oxide dry-etch on the non-linear resist profile to generate the nearly 45 degree linear profile in oxide.

The technical effect of the embodiments discussed herein is generation of nearly pure vertical emission of light from a Si photonic device that uses conventional CMOS process. Furthermore, the efficiency of the Si photonic device, as defined by a ratio of output light to input light, is much higher for the embodiments described herein than the efficiency of vertical emission of light from grating couplers discussed in the background section. The embodiments of the vertical-emitting optical coupler with the angled mirror (e.g., nearly 45 degree mirror) causing TIR enable wafer-level optical to electrical hybrid testing with high efficiency. Additionally, the vertical-emitting optical coupler discussed herein allows for backward-compatibility to existing pick-and-place packaging technologies designed for vertical-cavity surface-emitting laser (VCSEL) and reduce packaging complexity. Moreover, the vertical-emitting optical coupler discussed herein allows optical designers the freedom and flexibility to layout devices in ways that are difficult to test with edge-emitting couplers, and thus maximizes the available real estate on the wafer.

Coupling light in or out of the wafer or chip surface vertically allows testing of planar photonics circuits on the wafer directly after fabrication, similarly to standard testing method used for electronic integrated circuits. Furthermore, this surface coupling scheme allows greater circuit design flexibility so that not all optical input and/or output couplers have to be aligned along the chip facets. With sufficient coupling efficiency, low wavelength and polarization sensitivity, such surface couplers also allow reliable and low-cost packaging of the photonics chips using existing pick-and-place packaging technology.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" herein refers to two or more elements which are in direct contact (physically, electrically, magnetically, optically, etc.). The term "coupled" herein may also refer to two or more elements that are not in direct contact with each other, but still cooperate or interact with each other.

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

FIG. 1A is a system view 100 comprising a vertical optical coupler (VOC) coupled to an optical mode converter (OMC) 107. In one embodiment, the VOC includes the waveguide 104 with an angled mirror at a first end 105. In one embodiment, the OMC 107 is coupled to a photonics device 103, according to one embodiment of the invention. In one embodiment, the OMC 107 comprises a waveguide 104 made from a material having refractive index in a range of 1.45 to 3.45. In one embodiment, the material for the waveguide 104 is a polymeric material. In one embodiment, the polymeric material is one of: Silicon Nitride ($Si_3N_4$), Silicon Oxynitride (SiON), Polyimide, or SU8.

In one embodiment, the waveguide 104 comprises: a first end 105 configured to reflect light nearly vertical (nearly at a right angle) by TIR between the waveguide and another medium. In one embodiment, the other medium is air. In one embodiment, the other medium is glass. In other embodiments, other types of materials can be used for the other medium that cause TIR from the 45 degree angle cut inside the waveguide 104.

In one embodiment, the first end 105 of the waveguide 104 has an angled cut with an angle greater than a critical angle so that the angled cut reflects light at a direction which is nearly normal to the wafer plane using TIR, thus exhibiting a broadband response. In one embodiment, the angle of the angled cut is greater than the TIR angle. In one embodiment, the angle of the angled cut is a nearly 45 degree angle, which is in the path of light propagation through the waveguide, wherein the nearly 45 degree angle cut in the waveguide 104 to cause TIR between the waveguide 104 and the other medium (e.g., air).

In one embodiment, the nearly 45 degree angle cut is a negative 45 degree angle cut. In the above embodiment, an interface of the waveguide 104 (e.g., $Si_3N_4$ waveguide) and air is created at the nearly 45-degree mirror cut, which allows light incident to the cut to be 100% (or nearly 100%) reflected at nearly a 90° angle, exiting nearly normal to the wafer surface instead of from the edge of the waveguide 104.

In one embodiment, the waveguide 104 of the OMC 107 comprises: a second end 108 to receive the light for reflection. In one embodiment, the waveguide 104 comprises a third end 109 to output the reflected light. Another view of the first, second, and third ends discussed above is shown in FIG. 2.

Referring back to FIG. 1A, in one embodiment the substrate 101, that comprises the OMC 107, also includes the photonics device 103 coupled to the OMC 107. In one embodiment, another waveguide couples between the photonics device 103 and the waveguide 104 of the OMC 107, where the other waveguide is a single mode waveguide with sub-micron cross-section. The term "single mode" refers to a characteristic of the waveguide 104 indicating that the waveguide 104 supports only the fundamental optical mode. In the embodiments discussed herein, the other waveguide is a Si waveguide with upper and lower regions. In one embodiment, the lower region of the other Si waveguide is input to the waveguide 104 while the upper region of the other Si waveguide receives light from the photonics device 103 and pushes the received light down to the lower region. A view of the upper and lower regions of the Si waveguide discussed above is shown in FIG. 2.

Referring back to FIG. 1A, in one embodiment, the photonics device 103 is operable to modulate light before the light is received by the second end 108 of the waveguide 104. In one embodiment, the OMC 107 further comprises an ARC layer 109 abutting the third end of the waveguide 104, where the ARC layer 109 is deposited on the waveguide 104 to reduce reflection of the light being output from the third end of the waveguide 104. In one embodiment, the ARC layer 109 is an oxide-ARC layer. In such an embodiment, the ARC layer 109 is a thin layer of oxide deposited at the top surface of the waveguide 104. In such an embodiment, the ARC layer 109 reduces optical losses due to Fresnel reflection at the interface of the waveguide 104 e.g., $Si_3N_4$/air. In other embodiments, other materials may be used for the ARC layer 109 to cancel and/or reduce any reflection of light from the 45 degree mirror 105 as light leaves the waveguide 104 at an angle nearly normal (axis y) to the surface (axis x) of the substrate 101. In one embodiment, the light from the OMC 107 is received by another device. In one embodiment, the other device is a photo-detector 102.

Figure 1B:
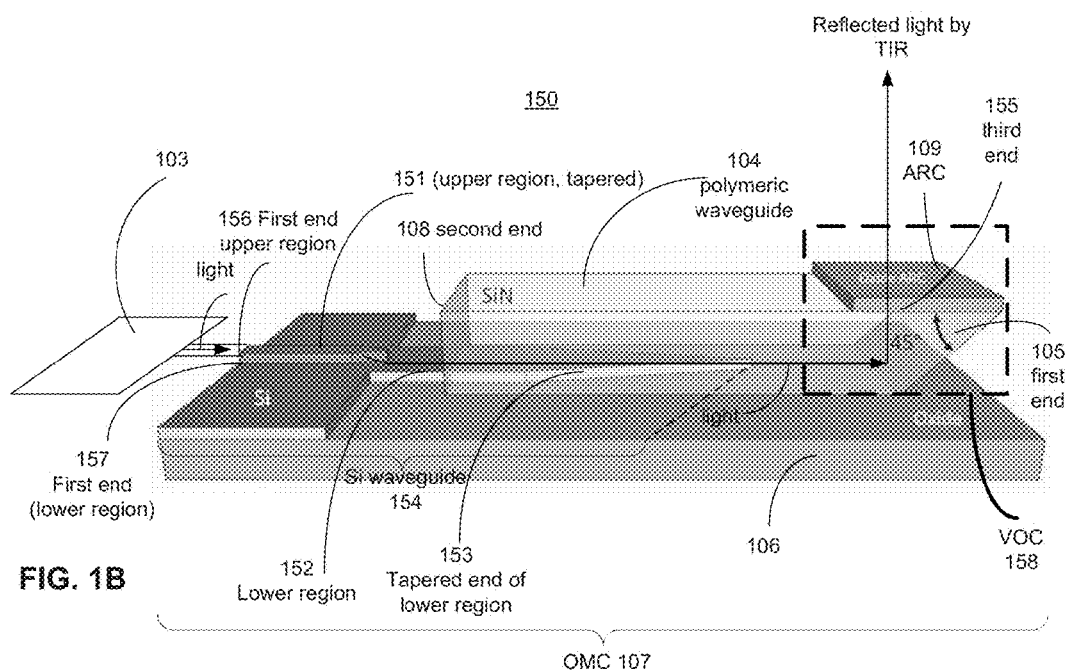
FIG. 1B is a detailed version of the VOC with the OMC coupled to the photonics device, according to one embodiment of the invention.

FIG. 1B is a detailed version 150 of the OMC 107 (which includes VOC 158) coupled to the photonics device 103, according to one embodiment of the invention. FIG. 1B is described with reference to FIG. 1A. In one embodiment, the third end 155 of the waveguide 104 has the ARC layer 109 (109 in FIG. 1A) deposited on it, instead of the entire top surface of the waveguide 104. The embodiment 150 comprises two waveguides—polymeric waveguide 104 and the Si waveguide 154. As discussed with reference to FIG. 1A, the Si waveguide 154 has two regions—lower region 152, which is also called the first region, and upper region 151, which is also called the second region.

In one embodiment, the lower region 152 of the Si waveguide 154 includes a first end 157 to receive light (e.g., from the photonics device 103). In one embodiment, the lower region 152 of the Si waveguide 154 includes an inverted tapered end 153 in the direction of light propagation to output the received light, wherein the inverted tapered end 153 of the Si waveguide 154 is positioned inside the polymeric waveguide 104 at the second end 108. One purpose of positioning the inverted tapered region 153 inside the polymeric waveguide 104 is to channel light to the polymeric waveguide 104 with minimum loss from the photonics device 103.

In one embodiment, the upper region 151 of the Si waveguide 154 includes a first end 156 to receive the light from the photonics device 103, where the first end 156 couples to the photonics device 103. In one embodiment, the upper region 151 has an inverted tapered end in the direction of the light propagation, wherein the upper region 151 is offset (in vertical direction) from the lower region 152 and abuts the lower region 152. In one embodiment, the upper region 151 (also called second region) has a length (in the direction of light propagation) shorter than a length (in the direction of light propagation) of the lower region 152 (also called first region). In one embodiment, the upper region 151 is positioned outside the polymeric waveguide 104. In other embodiments, the length (in the direction of light propagation) of the upper region 151 is equal or greater than the length (in the direction of light propagation) of the lower region 152. In one embodiment, the upper region 151 is positioned outside the polymeric waveguide 104

In one embodiment, the first ends (157, 156) of the upper 151 and lower 152 regions are configured to receive light from the photonics device 103. The light revived by the upper region 151 is pushed down to the lower region 152 for vertical reflection by the cut (mirror) at the second end 105 of the polymeric waveguide 104 (also simply called waveguide).

Figure 2:
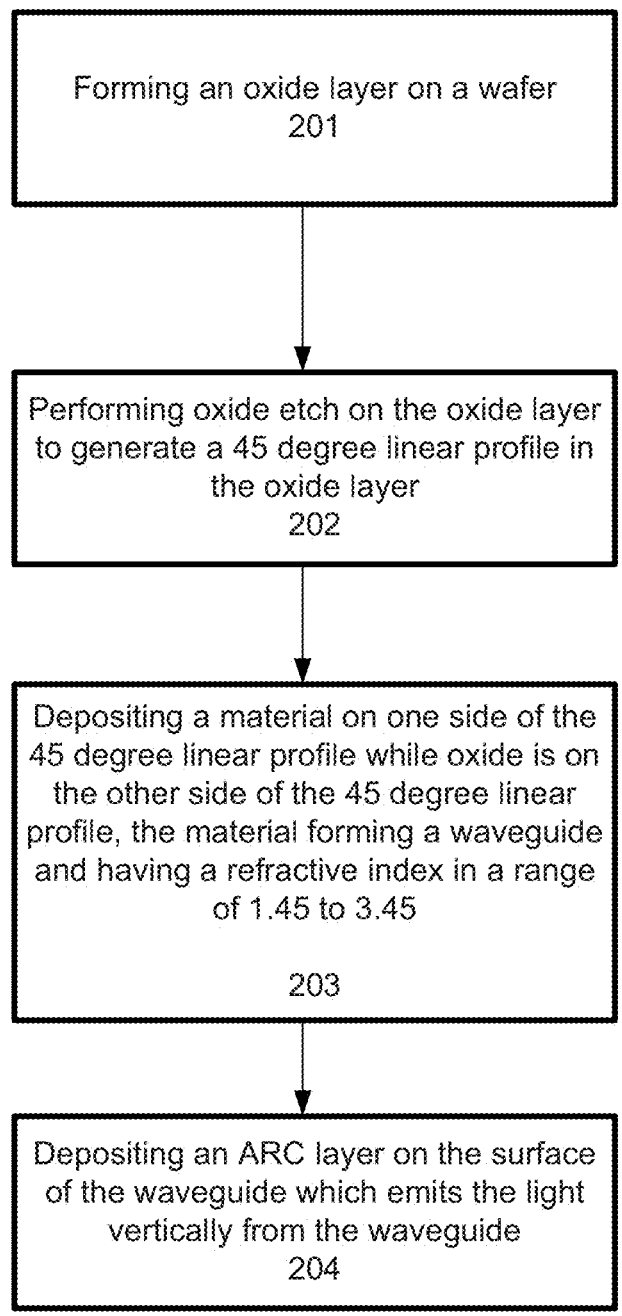
FIG. 2 is a high level flowchart of a method of forming the vertical optical coupler VOC, according to one embodiment of the invention.

FIG. 2 is a high level flowchart 200 of a method of forming the VOC 158 of the OMC 107, according to one embodiment of the invention.

Although the blocks in the flowchart 200 are shown in a particular order, the order of the actions can be modified. Thus, the illustrated embodiments can be performed in a different order, and some actions/blocks may be performed in parallel. Additionally, one or more actions/blocks can be omitted in various embodiments of providing a vertically emitting OMC for Si Photonics. The flowcharts of FIG. 2 are illustrated with reference to the embodiments of FIGS. 1A-B.

At block 201, an oxide layer is formed on a wafer. In one embodiment, the wafer is a Silicon-on-Insulator (SOI) wafer. In one embodiment, a 2.5 mm-thick layer of oxide is deposited on the SOI wafer. At block 202, the oxide is etched to generate a cut in the oxide such that the angle of the cut is greater than the critical angle so as to cause TIR. In one embodiment the oxide is etched to generate nearly 45 degree linear profile in the oxide layer. At block 203, a polymeric material (e.g., $Si_3N_4$) is deposited on one side of the nearly 45 degree linear profile while oxide is on the other side of the nearly 45 degree linear profile, the polymeric material forming a waveguide and having a refractive index in a rage of 1.45 to 3.45. At block 204, the ARC layer 109 is deposited on the surface 155 of the waveguide 104 which emits the light vertically from the waveguide 104.

Figure 3:
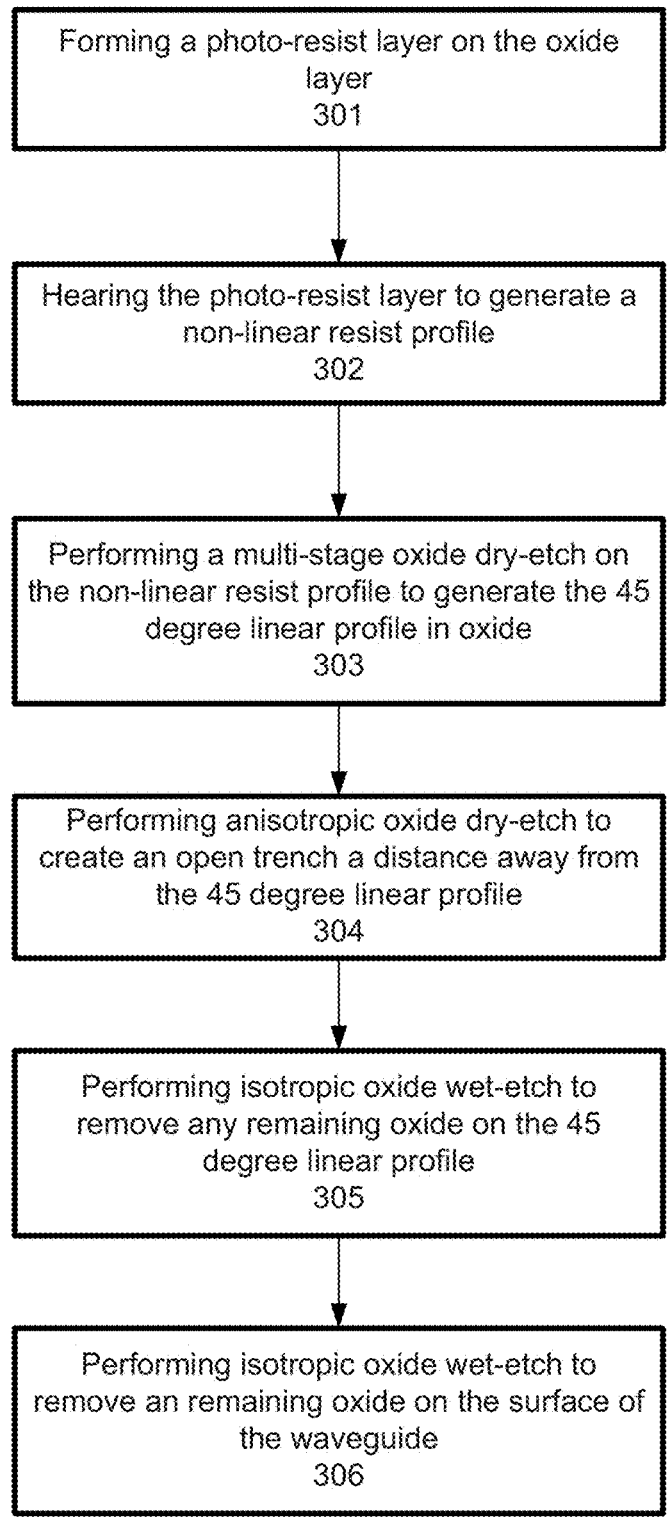
FIG. 3 is a flowchart with additional methods for forming the vertical optical coupler VOC, according to one embodiment of the invention.

FIG. 3 is a flowchart 300 with additional methods for forming the VOC 158, according to one embodiment of the invention. Although the blocks in the flowchart 300 are shown in a particular order, the order of the actions can be modified. Thus, the illustrated embodiments can be performed in a different order, and some actions/blocks may be performed in parallel. Additionally, one or more actions/blocks can be omitted in various embodiments of providing a vertically emitting OMC for Si Photonics. The flowcharts of FIG. 3 are illustrated with reference to the embodiments of FIGS. 1-2 and FIGS. 4A-E. FIGS. 4A-E are photographic images of the process of forming the waveguide 104 that emits light in a direction vertical 107 to surface of the wafer, according to one embodiment of the invention.

Figure 4A:
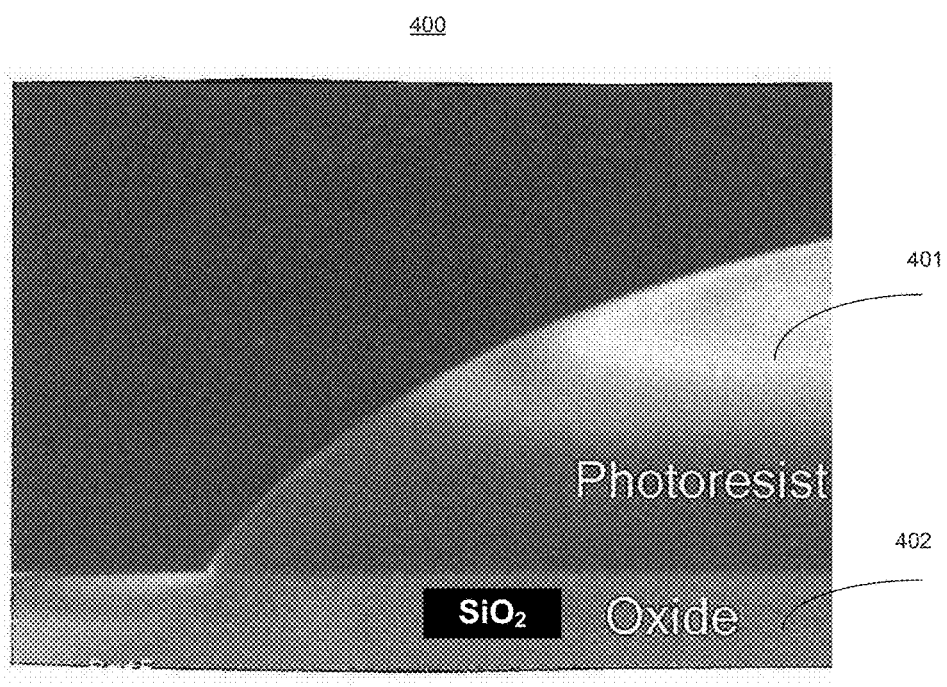
FIG. 4A-E are photographic images of the process of forming the VOC that emits light in a direction vertical to the plane of the wafer comprising the waveguide, according to one embodiment of the invention.

At block 301, a photo-resist layer is formed on the oxide layer. In one embodiment, a photo-resist with thickness twice of the oxide layer is spun on the oxide layer. At block 302, the photo-resist layer is heated to generate a non-linear photo-resist profile. In one embodiment, the photo-resist is reflowed to create the nonlinear photo-resist profile. FIG. 4A is a picture 400 showing the non-linear resist profile of the photo-resist 401, above the oxide layer 402, caused by heating. The picture 400 is taken after completing a photo-resist reflow.

Figure 4B:
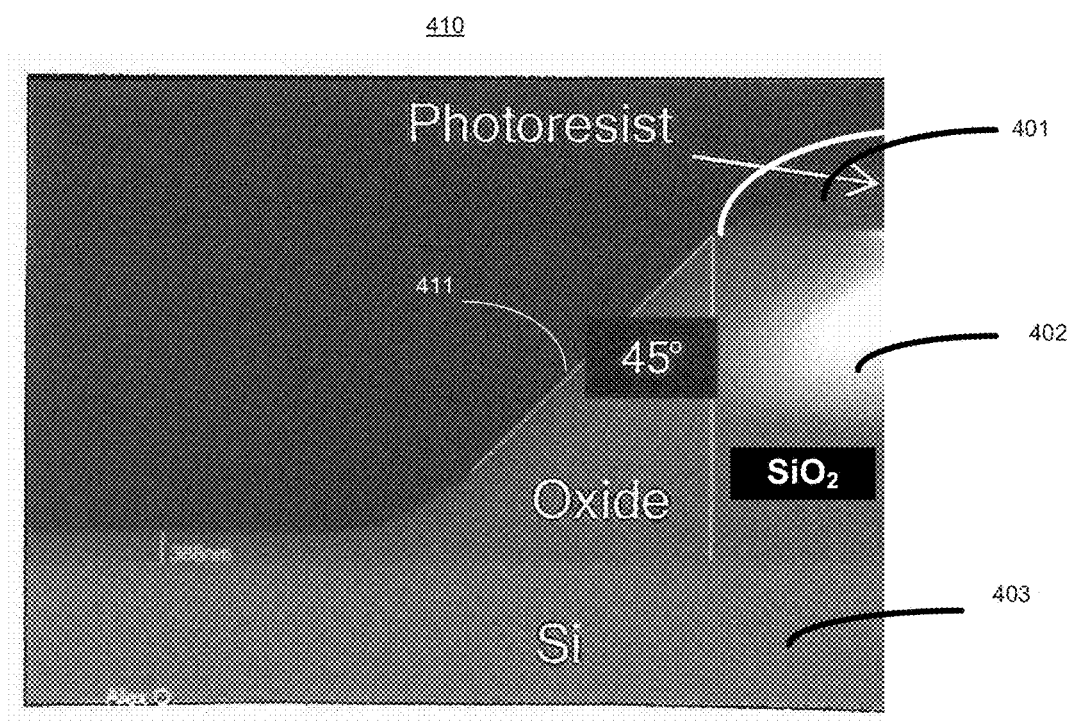

Referring back to FIG. 3, at block 303 a multi-stage oxide dry-etch process is performed on the non-linear resist profile to generate the nearly 45 degree linear profile in the oxide. FIG. 4B illustrates a picture 410 showing the nearly 45 degree linear profile 411 in the oxide layer 402, where the oxide layer 402 is above the Si layer 403. The picture 410 shows the profile of the nearly 45 degree oxide cut 411 after pattern transfer from photo-resist to oxide.

Figure 4C:
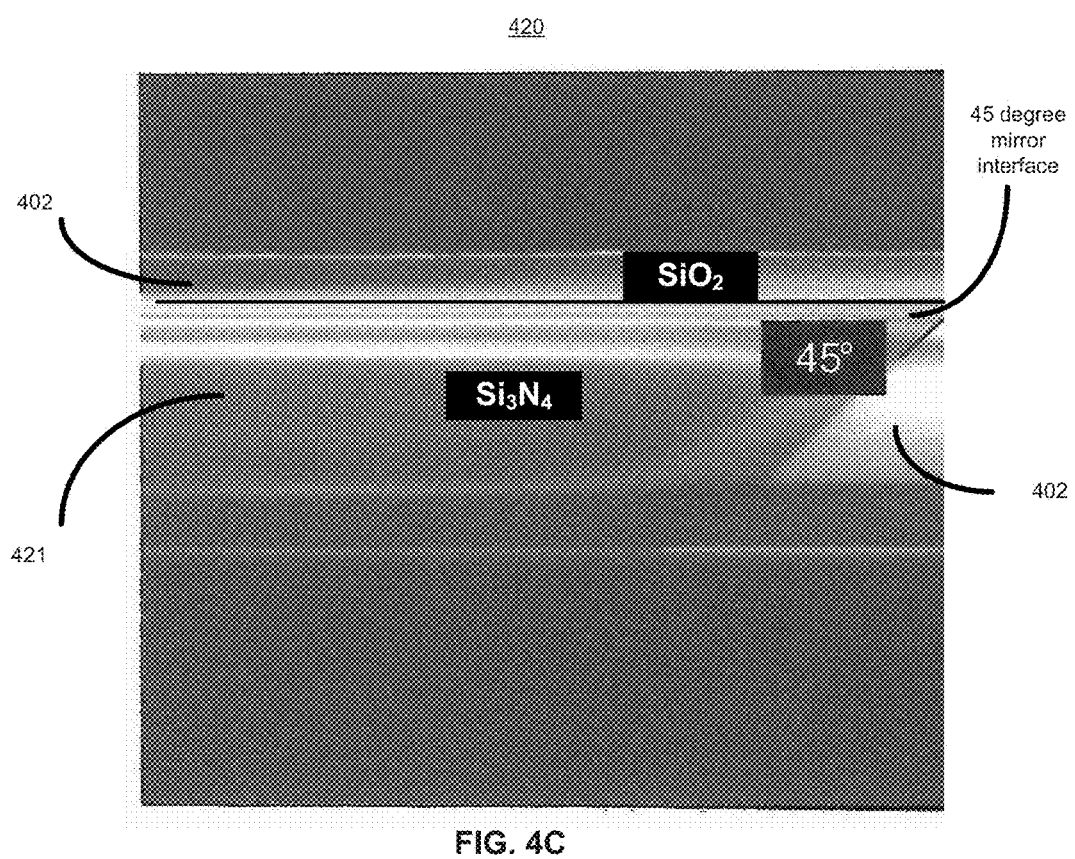

Referring back to FIG. 3, at block 304 an isotropic oxide dry-etch process is performed to create an open trench a distance away from the nearly 45 degree linear profile 411. In one embodiment, the distance is 1 μm. In one embodiment, the trench is formed to be filled with a polymeric material (e.g., $Si_3N_4$, polyimide, SU8, etc). The trench region for polymeric material deposition is lithographically defined. FIG. 4C illustrates a picture 420 with a trench 421 filled with $Si_3N_4$ (see 421). Picture 420 shows a cross-section after the trench is filled with the polymeric material ($Si_3N_4$) followed by a planarization process through chemical mechanical process (CMP) and $SiO_2$ deposition. In one embodiment, the dry-etch process is a multi-stage oxide dry-etch, where at each stage of the multi-stage oxide dry-etch process the selectivity between the photo-resist 401 and the oxide 402 is tuned. The term "selectivity" herein refers the amount of $SiO_2$ consumed divided by photo-resist (PR) consumed in a given etch time period, and noted by ($SiO_2$:PR). For example, if the $SiO_2$ etch rate is twice as the PR etch rate, the selectivity is 2-to-1 or (2:1).

Referring back to FIG. 3, at block 305 an isotropic oxide dry-etch process is performed to remove any remaining oxide 402 (of FIG. 4B) on the nearly 45 degree linear profile 411. At block 306, an isotropic oxide wet-etch process is performed to remove any remaining oxide 402 (of FIG. 4C) on the surface of the polymeric waveguide 104. In one embodiment, the surface of the wafer is then planarized through CMP.

In one embodiment, the TIR interface between the polymeric material and air (e.g., $Si_3N_4$/air interface) is created by applying another lithography mask to protect the fabricated waveguide 104. In one embodiment, the anisotropic oxide dry-etch process creates an open trench a distance away (e.g., 5 μm) away from the 45-degree mirror. In one embodiment, the isotropic oxide wet-etch process, i.e. buffered-oxide etch, is applied to remove the remaining oxide on the 45-degree mirror 411 as well as on the top surface of the waveguide 104 made from the polymeric material.

Figure 4D:
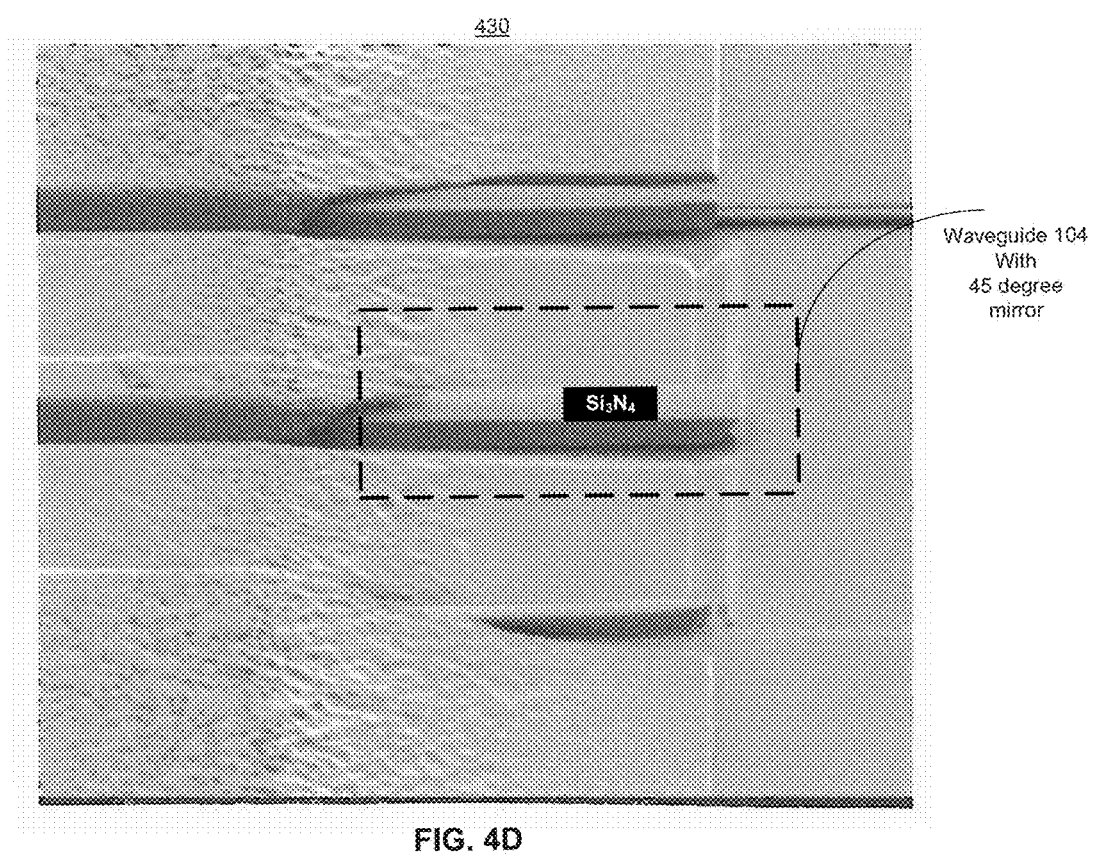
Figure 4E:
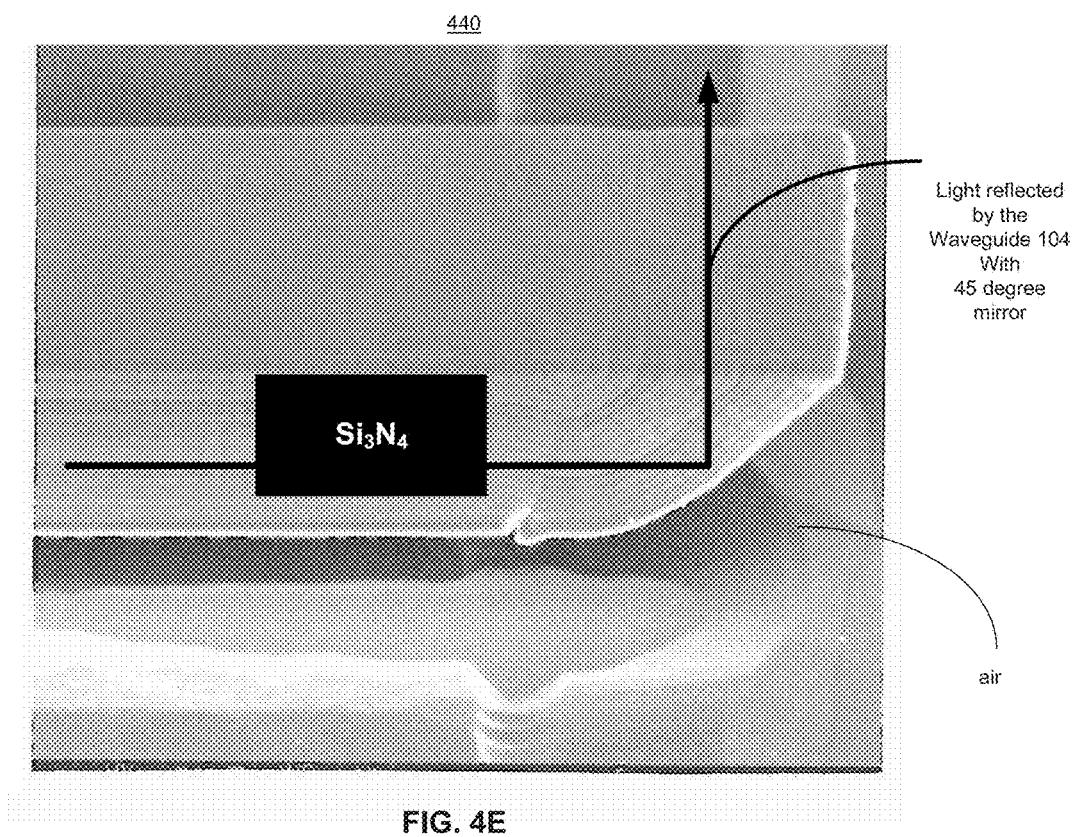

FIG. 4D and FIG. 4E show pictures 430 and 440 (zoomed version of one of the waveguides in picture 430) the 45 degree mirror in $Si_3N_4$ waveguide 104 after completing the process of oxide wet-etch. In one embodiment, a thin oxide layer is deposited on the polymeric (Si3N4) surface. In one embodiment, the thickness of the oxide is $\lambda/4/n_{oxide}$ to act as an ARC 109, where $\lambda$ is the operating wavelength, and $n_{oxide}$ is the oxide refractive index.

Figure 5:
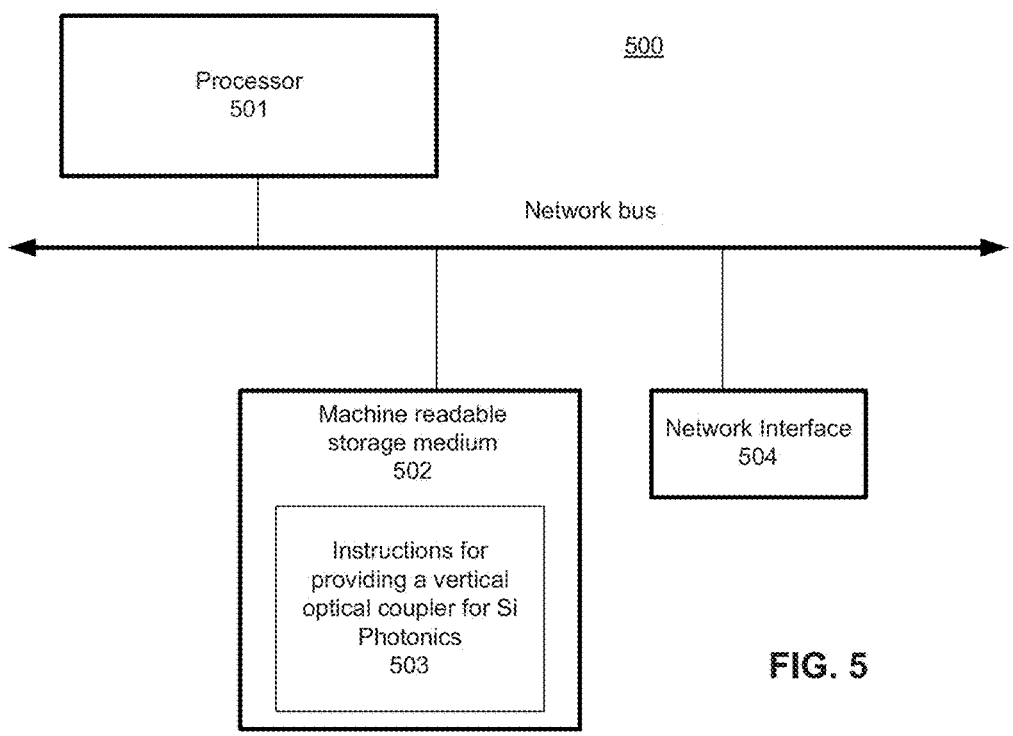
FIG. 5 is a computer system with machine-readable instructions stored on a machine storage medium, the machine-readable instructions for providing a VOC, according to one embodiment of the invention.

FIG. 5 is a computer system 500 comprising a processor 501 used for providing a vertically emitting OMC for Si Photonics, according to one embodiment of the invention. FIG. 5 also includes a machine-readable storage medium 502 to execute computer readable/executable instructions 503 to perform the methods of various embodiments (e.g., instructions to implement the flowchart of FIGS. 2-3 and other processes discussed in the description). The computer readable/executable instructions are executed by the processor 501.

The machine-readable medium 502 may include, but is not limited to, flash memory, optical disks, HDD (hard disk drive), SSD (solid state drive), CD-ROMs, DVD ROMs, RAMs, EPROMs, EEPROMs, magnetic or optical cards, or other type of machine-readable media suitable for storing electronic or computer-executable instructions 503. For example, embodiments of the invention may be downloaded as a computer program (e.g., BIOS) which may be transferred from a remote computer (e.g., a server) to a requesting computer (e.g., a client) by way of data signals via a communication link (e.g., a modem or network connection) 504.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description.

For example, linear slope 411 in the oxide layer can be generated by means other than the photo-resist reflow process discussed above. In one embodiment gray-scale mask patterning can also be used to create the linear slope in oxide. In another embodiment, Chemically Assisted Ion Beam Etching (CAIBE) can be used to create the linear slope in the oxide layer. The embodiments of the invention are intended to embrace all such alternatives, modifications, and variations as to fall within the broad scope of the appended claims.

We claim:

1. A device comprising:
a first horizontal waveguide made from a material having a refractive index in a range of 1.45 to 3.45, said material being other than silicon, wherein the first horizontal waveguide includes a first end angled to reflect light nearly vertical by total internal reflection between the first horizontal waveguide and another medium, a second end to receive the light for reflection, and a third end to output the reflected light, the first horizontal waveguide having a first tapered region to compress light, wherein the first horizontal waveguide comprises a non tapered region that extends from the second end to the first tapered region, the non tapered region positioned at a same horizontal plane along a direction of propagation of the light through the first horizontal waveguide as the first tapered region, the non tapered region positioned to receive the light at the second end;
a second horizontal waveguide coupled to the second end of the first horizontal waveguide, the second horizontal waveguide to receive light for the first horizontal waveguide before the first waveguide, the second horizontal waveguide having a second tapered region to compress light, the first tapered region extending closer to the first end of the first horizontal waveguide than the second horizontal waveguide.

2. The device of claim 1, wherein the material for the first horizontal waveguide is a polymeric material.

3. The device of claim 2, wherein the polymeric material is one of:
Silicon Nitride ($Si_3N_4$);
Silicon Oxynitride (SiON);
Polyimide; or
SU8.

4. The device of claim 1 wherein:
the second horizontal waveguide is composed of silicon (Si).

5. The device of claim 1, wherein the second horizontal waveguide has a length shorter than a length of the first waveguide.

6. The device of claim 1, wherein the second horizontal waveguide is to receive light from a photonics device.

7. The device of claim 6, wherein the photonics device is operable to modulate light before it is received by the second horizontal waveguide.

8. The device of claim 4 further comprising a layer of oxide coupled to the first horizontal waveguide.

9. The device from claim 1 further comprising an anti-reflective coating (ARC) layer, abutting the third end of the first horizontal waveguide, wherein the ARC layer is to reduce internal reflection of the light being output from the third end of the first horizontal waveguide.

10. The device of claim 9, wherein the ARC layer is an oxide-ARC layer.

11. The device of claim 1, wherein the first end has a nearly 45 degree angle cut in the path of light propagation through the first horizontal waveguide, the nearly 45 degree angle to cause the total internal reflection between the first horizontal waveguide and the other medium.

12. The device of claim 11, wherein the nearly 45 degree angle is a negative 45 degree angle.

13. The device of claim 1, wherein the other medium is air.

14. A system comprising:
a) a vertical mode coupler including:
a first horizontal waveguide made from a material having a refractive index in a range of 1.45 to 3.45, said material being other than silicon, wherein the first horizontal waveguide comprises a first end angled to reflect light nearly vertical by total internal reflection between the first horizontal waveguide and another medium, a second end to receive the light for reflection, and a third end to output the reflected light, the first horizontal waveguide having a first tapered region to compress light, wherein the first horizontal waveguide comprises a non tapered region that extends from the second end to the first tapered region, the non tapered region positioned at a same horizontal plane along a direction of propagation of the light through the first horizontal waveguide as the first tapered region, the non tapered region positioned to receive the light at the second end;
a second horizontal waveguide coupled to the second end of the first horizontal waveguide, the second horizontal waveguide to receive light for the first horizontal waveguide before the first horizontal waveguide, the second horizontal waveguide having a second tapered region to compress light, the first tapered region extending closer to the first end of the first horizontal waveguide than the second horizontal waveguide; and
b) a photonics device coupled to the second horizontal waveguide and operable to modulate light.

15. The system of claim 14, wherein the material is a polymeric material that is one of:
Silicon Nitride ($Si_3N_4$);
Silicon Oxynitride (SiON);
Polyimide; or
SU8.

16. The system of claim 14, wherein the second horizontal waveguide comprises:
silicon (Si).

17. The system of claim 14, wherein the first end has a nearly 45 degree angle in the path of light propagation through the first horizontal waveguide, the nearly 45 degree angle to cause the total internal reflection between the first horizontal waveguide and the other medium.

* * * * *